United States Patent
Hooi et al.

(10) Patent No.: US 9,543,956 B2
(45) Date of Patent: Jan. 10, 2017

(54) SYSTEMS AND METHODS FOR CONFIGURING AN SOPC WITHOUT A NEED TO USE AN EXTERNAL MEMORY

(75) Inventors: Woi Jie Hooi, Sitiawan (MY); Kok Heng Choe, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 276 days.

(21) Appl. No.: 13/103,878

(22) Filed: May 9, 2011

(65) Prior Publication Data

US 2012/0286821 A1    Nov. 15, 2012

(51) Int. Cl.
*H03K 19/177* (2006.01)
*G06F 17/50* (2006.01)
*G06F 21/76* (2013.01)

(52) U.S. Cl.
CPC ......... *H03K 19/177* (2013.01); *G06F 17/5054* (2013.01); *G06F 21/76* (2013.01); *H03K 19/1776* (2013.01); *H03K 19/17748* (2013.01)

(58) Field of Classification Search
CPC ............... H03K 19/1776; H03K 19/17748; H03K 19/17736; H03K 19/17744; H03K 19/17756; H03K 19/17776; H03K 19/1737; H03K 19/17728; H03K 19/17704; H03K 19/17708; H03K 19/17724; G06F 2015/768; G06F 17/5054; G06F 21/76; G05B 2219/25482; G05B 2219/23287; G05B 2219/13108; G05B 2219/13061; G05B 2219/13007; G05B 2219/25268
USPC ............................................. 326/37–41, 47
See application file for complete search history.

(56) References Cited

U.S. PATENT DOCUMENTS

| | | | | |
|---|---|---|---|---|
| 5,787,007 A | * | 7/1998 | Bauer | G06F 17/5054 326/39 |
| 6,148,390 A | * | 11/2000 | MacArthur | H03K 19/17728 365/201 |
| 6,483,342 B2 | * | 11/2002 | Britton et al. | 326/39 |
| 6,842,039 B1 | * | 1/2005 | Guzman | H03K 19/1774 326/38 |
| 6,879,526 B2 | | 4/2005 | Lynch et al. | |
| 6,998,871 B2 | * | 2/2006 | Mulligan | 326/37 |
| 7,459,931 B1 | * | 12/2008 | Tang et al. | 326/38 |
| 7,493,511 B1 | * | 2/2009 | Yin et al. | 713/600 |
| 7,518,396 B1 | * | 4/2009 | Kondapalli | H03K 19/17776 326/38 |
| 7,532,029 B1 | | 5/2009 | Asaduzzaman et al. | |
| 7,535,254 B1 | | 5/2009 | Case | |
| 7,573,295 B1 | * | 8/2009 | Stadler | 326/40 |

(Continued)

FOREIGN PATENT DOCUMENTS

CN      1815628 A      8/2006

OTHER PUBLICATIONS

Extended European Search Report dated Apr. 4, 2013 issued in EP Application No. 12167132.5.

(Continued)

*Primary Examiner* — Vibol Tan
(74) *Attorney, Agent, or Firm* — Fletcher Yoder, P.C.

(57) ABSTRACT

Systems and techniques for configuration of a system on a programmable chip (SOPC) are described. By configuring the SOPC, during power-up, with a voltage input instead of with a flash memory or another non-volatile memory, the systems and techniques may save cost and board space.

14 Claims, 9 Drawing Sheets

(56) References Cited

U.S. PATENT DOCUMENTS

| | | | |
|---|---|---|---|
| 7,652,500 B1* | 1/2010 | Tang | H03K 19/17744 326/38 |
| 9,098,641 B1* | 8/2015 | Kutz | G06F 13/4022 |
| 2003/0122578 A1* | 7/2003 | Masui | G06F 21/76 326/39 |
| 2006/0119384 A1* | 6/2006 | Camarota | G06F 15/7867 326/38 |
| 2008/0297196 A1* | 12/2008 | Kelem et al. | 326/38 |
| 2009/0058462 A1* | 3/2009 | Mason | G06F 17/5027 326/38 |
| 2009/0128186 A1* | 5/2009 | Balasubramanian | G01K 7/015 326/38 |
| 2009/0292978 A1* | 11/2009 | Miyama et al. | 714/807 |
| 2010/0232486 A1 | 9/2010 | Starr et al. | |
| 2010/0271071 A1* | 10/2010 | Bartley et al. | 326/101 |

OTHER PUBLICATIONS

Office Action dated Dec. 28, 2015 issued in CN Application No. 201210150248.7.

\* cited by examiner

SYSTEMS AND METHODS FOR CONFIGURING AN SOPC WITHOUT A NEED TO USE AN EXTERNAL MEMORY

FIELD OF THE INVENTION

The present disclosure generally relates to systems and techniques for configuring a system on a programmable chip (SOPC) without a need to use an external memory.

BACKGROUND

A system on a programmable chip (SOPC) includes one or more integrated circuits that may be programmed to perform one or more logic functions. One type of SOPC may be implemented using a Field Programmable Gate Array (FPGA). The FPGA may include an array of logic blocks. These logic blocks can include, for example, input/output Blocks, Random Access Memory Blocks (BRAMs), multipliers, Digital Signal Processing blocks (DSPs), processors, clock managers, Delay Lock Loops (DLLs), Multi-Gigabit Transceivers (MGTs), and so forth.

Each logic block typically includes both programmable interconnect and programmable logic. The programmable interconnect typically includes a large number of interconnect lines of varying lengths interconnected by Programmable Interconnect Points (PIPs). The programmable interconnect and the programmable logic are typically programmed by loading a stream of configuration data into internal configuration memory cells that define how the logic blocks are configured. The configuration data may be read from a configuration memory, such as an external programmable read-only memory (PROM) or external Flash memory. The collective states of the individual memory cells then determine the function of the FPGA.

As FPGAs grow in size and capability, the amount of configuration memory used to configure the logic blocks also increases. This configuration memory may be expensive and may also require additional space on a board on which the SOPC is implemented. For example, the Flash memory may be costly and also may consume a large amount of board area.

SUMMARY OF THE INVENTION

Systems and techniques for configuration of a system on a programmable chip (SOPC) may reduce a need for flash memory or any such non-volatile memory at a time the SOPC is being configured. The systems and techniques reduce a need for the non-volatile memory by providing one or more voltage sources. Rather than obtaining configuration data from the non-volatile memory, the one or more voltage sources provide the configuration data. As a result, cost of designing and implementing the flash memory or the other non-volatile memory may be reduced and more board space on a printed circuit board (PCB) may be available for other devices.

In one aspect, a system is described. The system may include a first voltage input, a second voltage input, and the SOPC. The SOPC may include a core and an interface. During power-up of the SOPC, the interface may be configured via the first voltage input or the second voltage input. Accordingly, the configuration via the first or second voltage input during the power-up may reduce a need for the flash memory or any such non-volatile memory at a time the SOPC is being configured.

BRIEF DESCRIPTION OF THE DRAWINGS

The systems and techniques may best be understood by reference to the following description taken in conjunction with the accompanying drawings, which illustrate various embodiments of the present systems and techniques. In the drawings, structural elements having the same or similar functions are denoted by like reference numerals.

DETAILED DESCRIPTION

Figure 1:
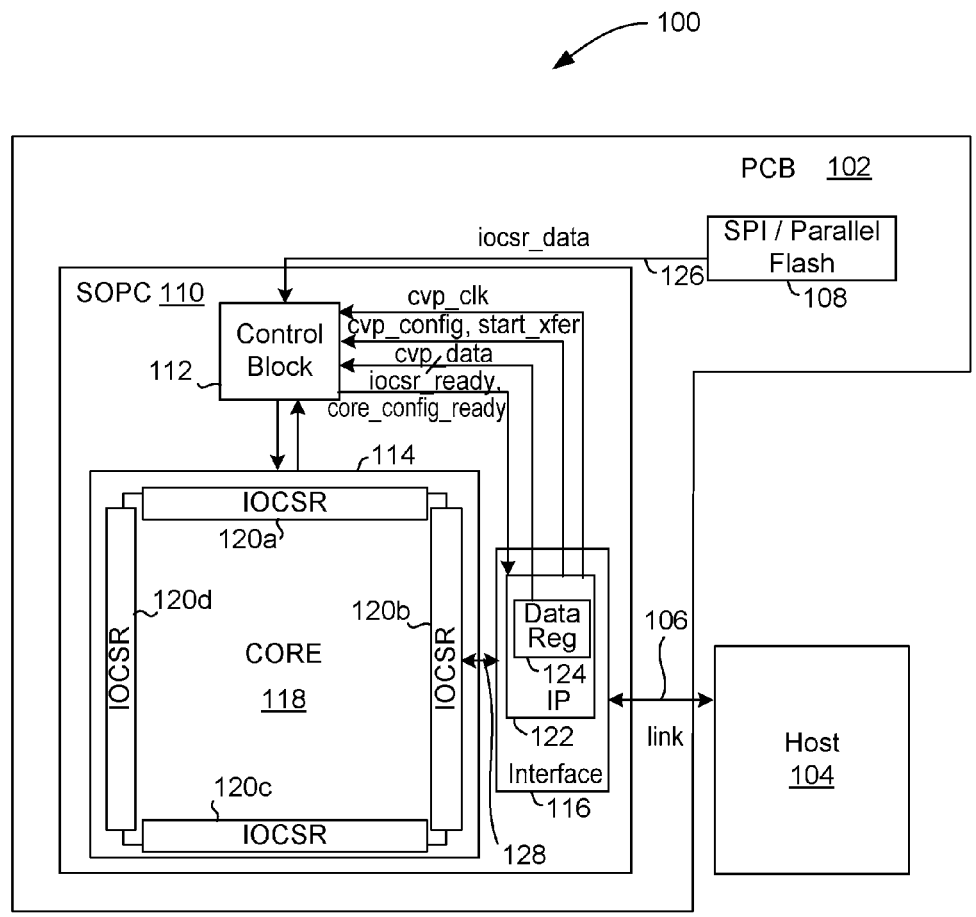
FIG. 1 shows an exemplary system on a programmable chip (SOPC) that is configured using a Flash memory.

It is noted that in the drawings, structural elements having the same or similar functions are denoted by like reference numerals. Referring now to FIG. 1, a system 100 may include a printed circuit board (PCB) 102, a host 104, and a link 106, which is a communication link. A flash memory 108 and an SOPC 110 may be located on PCB 102. SOPC 110 may include a control block 112, a sub-SOPC 114, and an interface 116. Sub-SOPC 114 may include a configurable core 118 and multiple chains 120 of input/output configuration shift registers (IOCSRs). Core 118 may include one or more logic blocks. Chain 120a or a portion of the chain 120a is an example of a logic block. Interface 116 may include a high-speed serial or parallel interface, such as a transceiver. As another example, interface 116 may include an IO pad. The IO pad may be a tristate buffer and may have an IO pin at its output.

Interface 116 may include a block 122 that further may include one or more data registers 124. Block 122 may be a partially-configurable block. In various embodiments, not all parameters of the partially-configurable block are pre-configured and may not be configured at a time of implementation of the partially-configurable block in a field of application. Examples of the field of application may include implementing SOPC 110 within a cell phone, within a radar system, or within a video game console. Examples of parameters of a logic block include a data width of the logic block, a speed of transmission of data from the logic block, and a speed of reception of data by the logic block.

Host 104 may be a computer or a processor. Host 104 may communicate with interface 116 via link 106 by using a peripheral component interconnect express (PCI-e) standard, a PCI standard, a 2.5 gigabit standard, a 5 gigabit standard, or an 8 gigabit standard. An example of link 106 may include a PCI-e link, a PCI link, a link that communicates using the 2.5 gigabit standard, the 5 gigabit standard, or the 8 gigabit standard. Control block 112 may be a controller and the controller may include a finite state machine and one or more registers. Flash memory 108 may be located off-chip. For example, flash memory 108 may be located on a substrate separate from a substrate of a chip in which SOPC 110 may be integrated.

In various embodiments, during power-up of SOPC 110, control block 112 may receive a first set of IOCSR configuration data from flash memory 108 via a link 126 either serially or in parallel and sends the first set of IOCSR configuration data to chains 120 to configure the IOCSRs of chains 120. Upon configuring the IOCSR with the first set of IOCSR configuration data, control block 112 may receive via link 126, either serially or in parallel, a first set of interface configuration data from flash memory 108 and may store the first set of interface configuration data within the IOCSRs of one or more chains 120. IOCSRs of one or more chains 120 may shift the first set of interface configuration data from one IOCSR to another IOCSR in the one or more chains 120 to provide the first set of interface configuration data via a link 128 to interface 116 to configure the interface 116.

In various embodiments, upon configuration of interface 116, interface 116 may establish communication via link 106 with host 104, may receive core configuration data from the host 104 via link 106 and may store the core configuration data in one or more data registers 124. Control block 112 may receive the core configuration data from one or more data registers 124 of interface 116 and may send the core configuration data to core 118 to configure the core 118. At a time core 118 may be configured, the entire SOPC 110 may be configured.

In various alternative embodiments, instead of flash memory 108, another nonvolatile memory, such as a programmable read-only memory (PROM) may be used. In various alternative embodiments, flash memory 108 may not be located on PCB 102 and may be located on another PCB.

In various embodiments, logic block 122 may be a fully-configurable block. A structure within the fully-configurable block and all parameters of the fully-configurable block can be configured at a time the fully-configurable block is implemented within the field. Moreover, in various embodiments, SOPC 110 may include any number or any type of layout of chains 120 other than that shown in FIG. 1.

Figure 2:
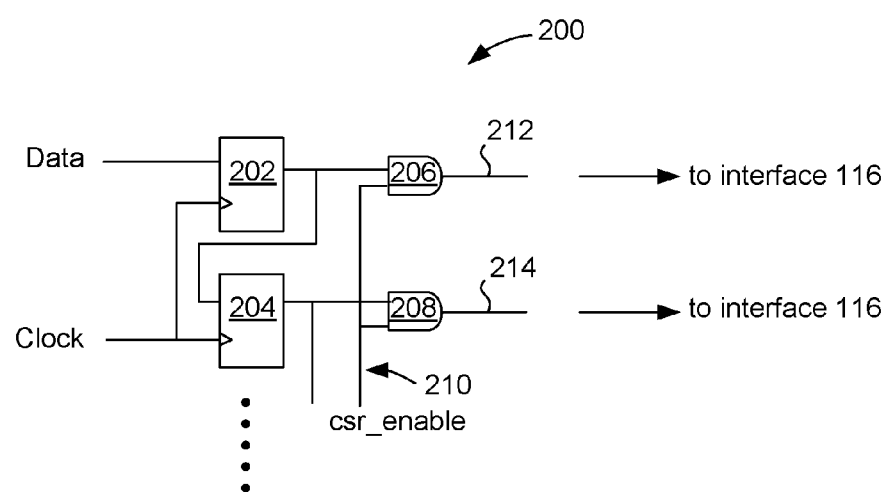
FIG. 2 shows an exemplary portion of the SOPC to illustrate configuration of an interface of the system.

With reference to FIG. 2, a system 200 may include a portion of chain 120a (FIG. 1) of IOCSRs. In some embodiments, system 200 may include multiple flip flops 202 and 204, each of which may be an example of a portion of IOCSR of chain 120a (FIG. 1). System 200 may further include multiple AND gates 206 and 208.

Flip flop 202 may receive a portion of the first set of interface configuration data from flash memory 108 and at a time a CSR enable signal 210 is asserted, may transfer the portion via a connection 212 to interface 116 (FIG. 1). Similarly, flip flop 204 may receive a portion of the first set of interface configuration data from flash memory 108 and at a time CSR enable signal is asserted, may transfer the portion via a connection 214 to interface 116 (FIG. 1). One or more connections, such as connection 212 and 214, may form link 128 that may connect interface 116 with chain 120a (FIG. 1). At a time CSR enable signal 210 is not asserted, flip flops 202 and 204 may not be able to send the first set of interface configuration data to interface 116.

It is noted that although two flip-flops and two AND gates are shown in FIG. 2, in various embodiments, chain 120a, 120b, 120c, or 120d may include any number of flip flops and AND gates. Moreover, although the above embodiments are described with reference to chain 120a, in some embodiments, chain 120b, 120c, or 120d may be used instead.

Figure 3:
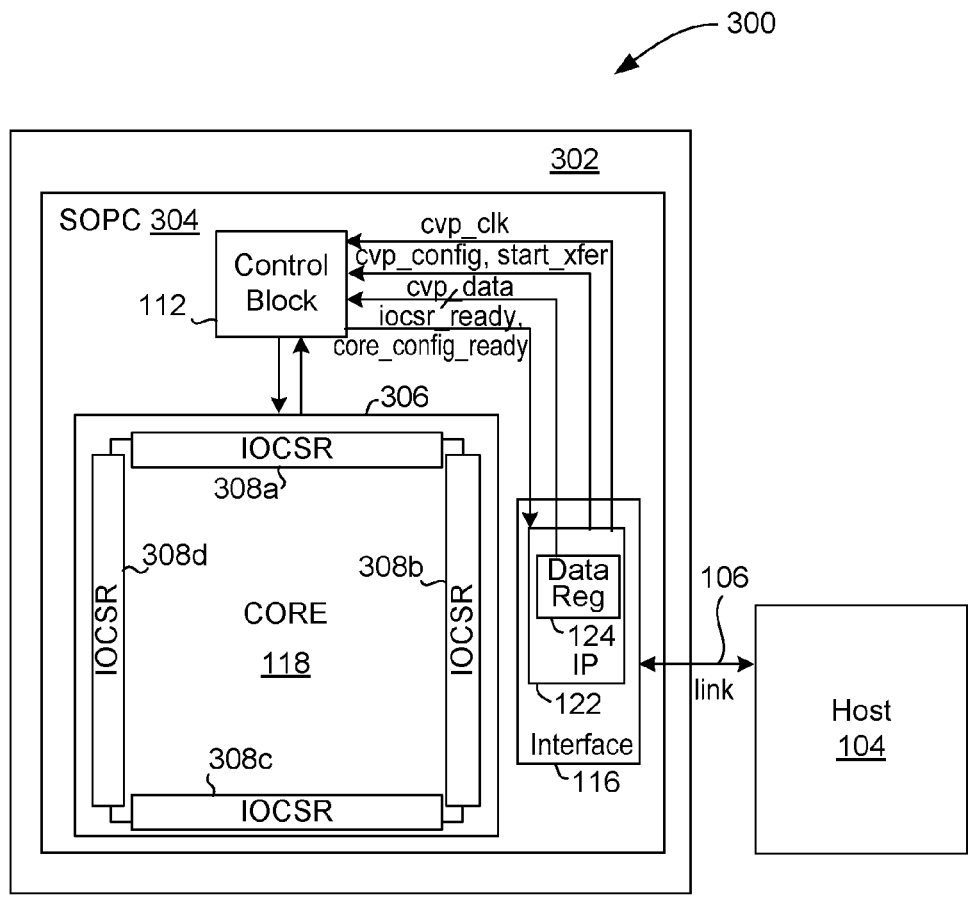
FIG. 3 shows an exemplary SOPC that is configured without using an external memory.

Referring to FIG. 3, a system 300 may include a PCB 302, link 106, and host 104. PCB 302 may include an SOPC 304 that further includes control block 112, interface 116, and a sub-SOPC 306. SOPC 304 may be a Field Programmable Gate Array (FPGA), an Application Specific Integrated Circuit (ASIC), or a custom ASIC. For example, SOPC 304 may be a Stratix V® FPGA available from Altera Corporation. Sub-SOPC 306 may include multiple chains 308 of IOCSRs and configurable core 118. System 300 may not include flash memory 108 (FIG. 1) or another non-volatile memory, such as a PROM, that sends configuration data to control block 112 to configure SOPC 304. Interface 116 may be connected to host 104 via link 106.

Figure 4:
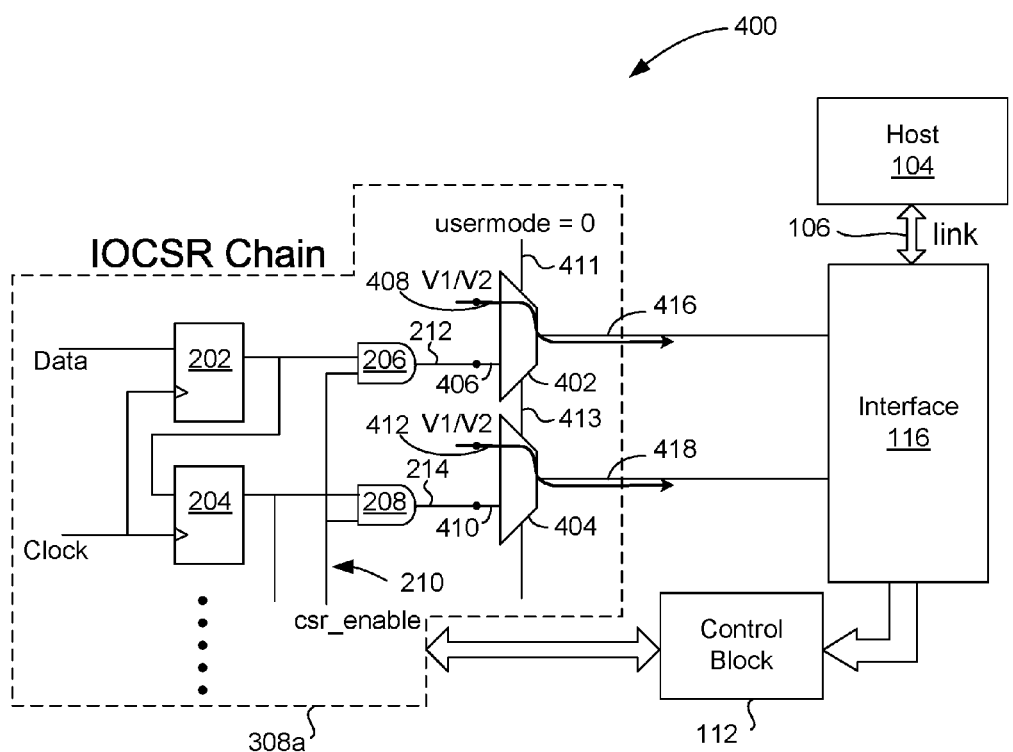
FIG. 4 shows an exemplary portion of the system of FIG. 3 to illustrate configuration of the system of FIG. 3 during a power-up mode and a configuration mode.

With reference to FIG. 4, in various embodiments, a system 400 may include host 104, interface 116, control block 112, link 106, chain 308a of IOCSRs, and multiple multiplexers 402 and 404. Connection 212 output from AND gate 206 may be connected to an input 406 of multiplexer 402. Another input 408 of multiplexer 402 may be connected to either a first voltage source V1 or a second voltage source V2. As an example, the first voltage source V1 may be a positive direct current (DC) voltage source VCC and the second voltage source V2 may be a ground DC voltage source VSS. As another example, the first voltage source V1 may provide an alternating current (AC) and the second voltage source V2 may provide an alternating current. Similarly, connection 214 output from AND gate 208 may be connected to an input 410 of multiplexer 404. Another input 412 of multiplexer 404 may be connected to either the voltage source V1 or the voltage source V2. Selection inputs 411 and 413 of multiplexers 402 and 404 may be connected to a user mode bit, which may be stored in a register of control block 112, and the usermode bit may be controlled by a value of the register, which may be controlled by the state machine of control block 112.

Power-Up Mode

Figure 6:
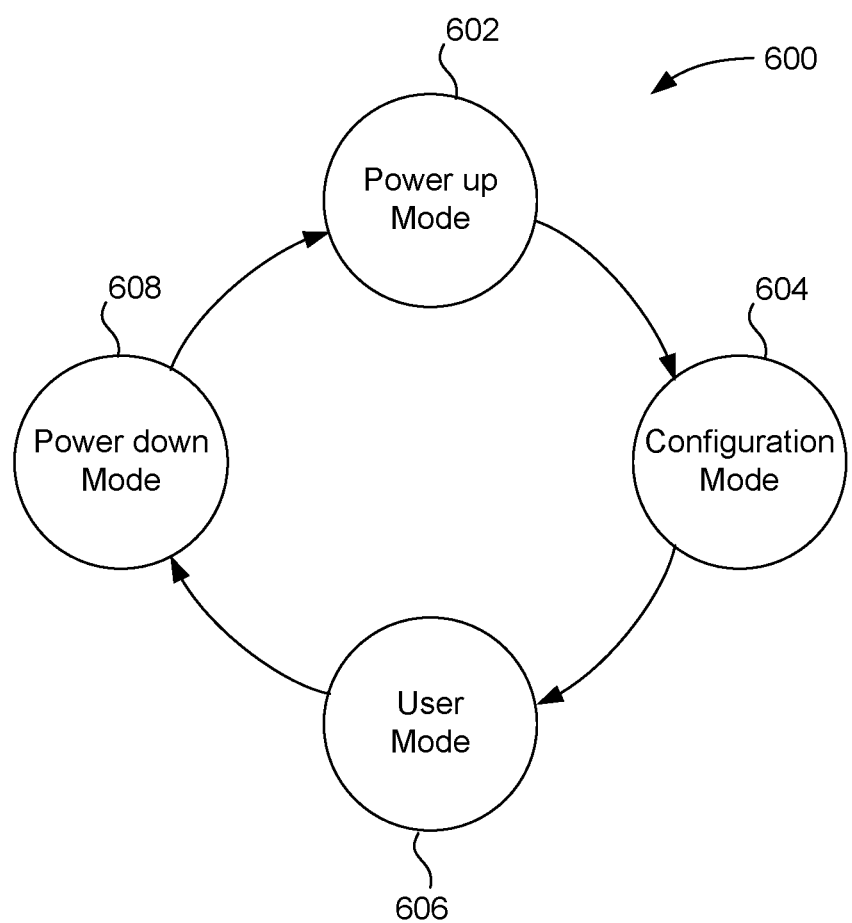
FIG. 6 shows an exemplary technique for configuring the SOPC of FIG. 3 during the various modes.

Referring to FIG. 6, a state diagram 600 illustrating various states or "modes" that the SOPC 304 (FIG. 3) may be in is described. When the SOPC 304 is first powered on, or reset, the SOPC 304 begins in a power-up mode 602. Reference will be made to FIGS. 3 and 4 to aid in the discussion of the power-up mode 602. In the power-up mode 602 (FIG. 6), power may be supplied to at least a portion of system 400 (FIG. 4), such as interface 116 and control block 112. Unlike in system 100, during power-up mode 602, the IOCSRs of multiple chains 308 (FIG. 3) may not be configured from the first set of IOCSR configuration data received from flash memory 108 (FIG. 1). Rather, during power-up mode 602, control block 112 may control the user mode bit to be of a first value, such as zero or one. At a time the user mode bit has the first value, each multiplexer 402 and 404 may select an input power signal (inputs 408 and 412), which may be a signal received from the voltage source V1 or V2. Multiplexer 402 may output at its output 416 the input power signal received from the voltage source V1 or V2 and multiplexer 404 may output at its output 418 the input power signal received from the voltage source V1 or V2. During power-up mode 602, input power signals output from outputs 416 and 418 may be the first set of interface configuration data used to configure interface 116.

Although two flip-flops, two AND gates, and two multiplexers are shown in FIG. 4, in various embodiments, system 400 may include any number of flip flops, any number of multiplexers, and any number of AND gates. The system 400 may include as many multiplexers as required to provide configuration data used to configure interface 116. Furthermore, each multiplexer may receive a fixed voltage signal, e.g., VCC or VSS, or may receive a selectable voltage signal. The voltage signals received by the multiplexer may be any values used to configure interface 116.

Configuration Mode

Referring back to FIG. 6, upon configuration of interface 116, a configuration mode 604 (FIG. 6) may be entered into by SOPC 304 (FIG. 3). During configuration mode 604, interface 116 may access the core configuration data and a second set of IOCSR configuration data from host 104 via link 106 (FIG. 3). For example, core 118 may be configured with the core configuration data accessed by interface 116 from host 104 and chains 308 (FIG. 3) may be configured with the second set of IOCSR configuration data accessed by interface 116 from host 104. While configuring chains 308 with the second set of IOCSR configuration data, a second set of interface configuration data may be stored in one or more IOCSRs of the chains 308. As in the power-up mode, control block 112 may control each multiplexer 402 and 404 to continue to output the input power signal received from the voltage source V1 or V2.

User Mode

Figure 5:
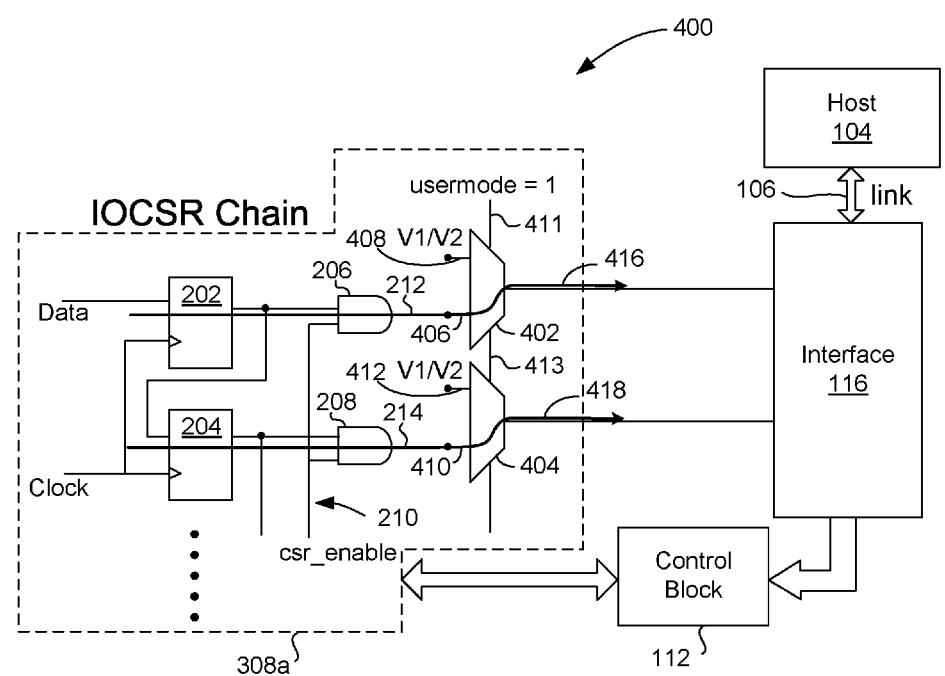
FIG. 5 shows the exemplary portion of the system of FIG. 3 to illustrate configuration of the system of FIG. 3 during a user mode.

FIG. 5 depicts the system 400 configured in a "user mode". Upon completion of configuration of core 118 and chains 308 of SOPC 304 during configuration mode 604, a user mode 606 (FIG. 6) may be entered into by the SOPC 304 (FIG. 3). Referring to FIG. 6, during user mode 606, control block 112 may control multiplexers 402 and 404 to output the second set of interface configuration data that is received from host 104 via interface 116 by chains 308 (FIG. 3). The second set of interface configuration data may be used to configure interface 116 during user mode 606. In some embodiments, control block 112 may change a value of the user mode bit from the first value to a second value, such as 1, and upon receiving the selection of the second value, multiplexers 402 and 404 may output the second set of interface configuration data received by chains 308 from host 104 via link 106 and interface 116. Moreover, during user mode 606, CSR enable signal may be enabled, AND gate 206 may output a first portion of the second set of interface configuration data received from flip flop 202 and AND gate 208 may output the remaining portion of the second set of interface configuration data received from flip flop 204. Flip flop 202 may output, synchronous with a clock signal, to AND gate 206, the first portion received from an IOCSR of chain 308a. Flip flop 204 may output, synchronous with the clock signal, to AND gate 208, the second portion received from an IOCSR of chain 308a. AND gates 206 and 208 may output the first and second portions to interface 116.

Power-Down Mode

In some embodiments, SOPC 304 (FIG. 3) may enter a power-down mode 608 (FIG. 6), which may occur as a result of a planned power-down of SOPC 304 or an unplanned power-down of SOPC 304, such as a result of a fault of a system that implements SOPC 304. When exiting power-down mode 608, the SOPC 304 may again configure itself beginning with power-up mode 602.

In various embodiments, while system 300 has been depicted as being configured without the use of non-volatile memory, such memory, e.g. Flash memory 108 (FIG. 1), may be provided for other SOPC functions during the user mode 606. System 300 may include flash memory 108 or another non-volatile memory but control block 112 may be restricted, during power-up mode 602 and configuration mode 604 (FIG. 6) from accessing configuration data from the flash memory 108 or the other non-volatile memory. In these various embodiments, SOPC 304 may be restricted from being configured by configuration data stored within flash memory 108 or the other non-volatile memory by using a switch (not shown) that is controlled by control block 112. For example, during power-up mode 602 and configuration mode 604, control block 112 may open the switch to restrict SOPC 304 from being configured by configuration data stored within flash memory 108 or the other non-volatile memory.

Figure 7:
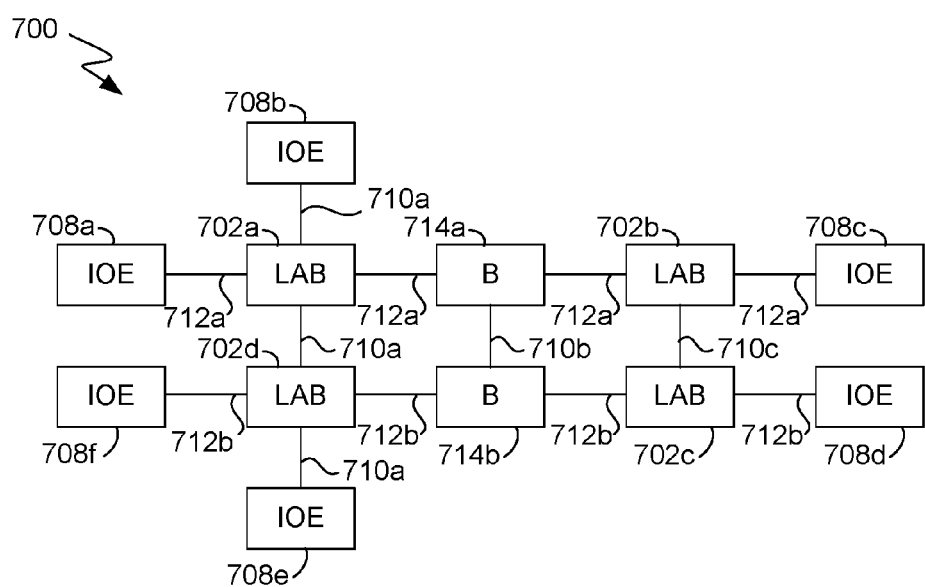
FIG. 7 is shows an exemplary programmable logic device (PLD), which is used to implement the SOPC of FIG. 3.

The SOPC 304 can be implemented using a PLD. With reference to FIG. 7, a PLD 700 may include a two-dimensional array of programmable logic array blocks (LABs) 702 that are interconnected by a network of multiple column interconnects 710 and multiple row interconnects 712 of varying length and speed. Any of the LABs 702, e.g., LAB 702c, can perform one or more functions, such as, digital signal processing (DSP), addition, multiplication, subtraction, etc. The network of column interconnects 710 and row interconnects 712 may include multiple switching circuits (not shown) that can be configured. LABs 702 may include multiple logic elements (LEs) (not shown) and each LE may include one or more registers (not shown). The LEs of one LAB 702a may be coupled to LEs of another LAB 702b via one or more switching circuits (not shown). A set of input/output (I/O) elements 708 may be located around the periphery of PLD 700 to support numerous single-ended and differential JO standards. PLD 700 may further include a set of buffers (Bs) 714 that couple to LABs 702. The buffers 714 may be used to store data that is transferred between LABs 702. PLD 700 may function synchronous or asynchronous with one or more clock signals received via a clock tree (not shown). The clock tree may be overlaid on the PLD 700.

Figure 8:
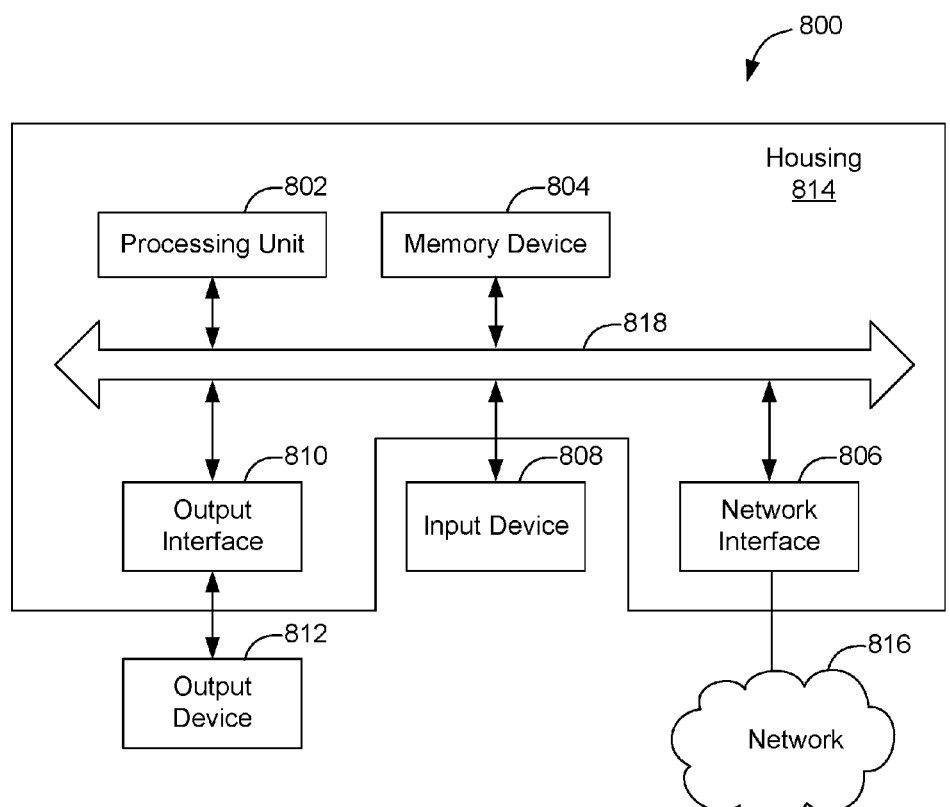
FIG. 8 shows an exemplary computer system for designing and generating configuration information used to configure the SOPC of FIG. 3.

The PLD 700 may be configured using a computer system. Referring to FIG. 8, a computer system 800 may include a processing unit 802, a memory device 804, a network interface 806, an input device 808, an output interface 810, and an output device 812. Network interface 806, output interface 810, memory device 804, and processing unit 802 may be located within a housing 814 of the computer system 800.

Processing unit 802 may be a central processing unit (CPU), a microprocessor, a floating point coprocessor, a graphics coprocessor, a hardware controller, a microcontroller, a programmable logic device programmed for use as a controller, a network controller, or other processing unit. Memory device 804 may be a random access memory (RAM), a read-only memory (ROM), or a combination of RAM and ROM. For example, memory device 804 may include a non-transitory computer-readable medium, such as a floppy disk, a ZIP™ disk, a magnetic disk, a hard disk, a compact disc-ROM (CD-ROM), a recordable CD, a digital video disc (DVD), or a flash memory. Memory device 804 may store a program code for in accordance with embodiments of the present invention for execution by the processing unit 802. For example, memory device 804 may store the program code for creating a design of SOPC 304, and configuring the SOPC 304 (FIG. 3), to name a few.

Network interface 806 may be a modem or a network interface card (NIC) that allows processing unit 802 to communicate with a network 816, such as a wide area network (WAN) or a local area network (LAN). Processing unit 802 may be coupled via a wireless connection or a wired connection to network 816. Examples of the wireless connection include a connection using Wi-Fi protocol or a WiMax protocol. The Wi-Fi protocol may be an IEEE 802.11, IEEE 802.11a, IEEE 802.11b, IEEE 802.11g, or IEEE 802.11i protocol. Examples of input device 108 include a mouse, a display device, a keyboard, a stylus, a microphone, a keypad, etc.

Output device 812 may be a liquid crystal display (LCD) device, a plasma display device, a light emitting diode (LED) display device, or a cathode ray tube (CRT) display device. Examples of output interface 810 include a video controller that drives output device 812 to display one or more images based on instructions received from processing unit 802. In various embodiments, input device 808 and output device 812 may be integrated within the same device, such as a display device having a touch screen. Processing unit 102 accesses the program code stored on memory device 804 or stored on a remote memory device (not shown), similar to memory device 804, via network 816. The processor unit 102 executes the program code stored therein in order to implement the methods in accordance with various embodiments of the present invention. Processing unit 802, memory device 804, network interface 806, input device 808, output interface 810, and output device 1812 communicate with each other via a bus 818.

In various embodiments, system 800 may not include input device 808 and/or network interface 806. In some embodiments, network interface 806, output interface 810, memory device 804, and processing unit 802 may be located outside the structure of housing 814.

In some embodiments, multiple memory devices may be used instead of memory device 804. Moreover, in one embodiment, multiple processing units may be used instead of processing unit 802.

Figure 9:
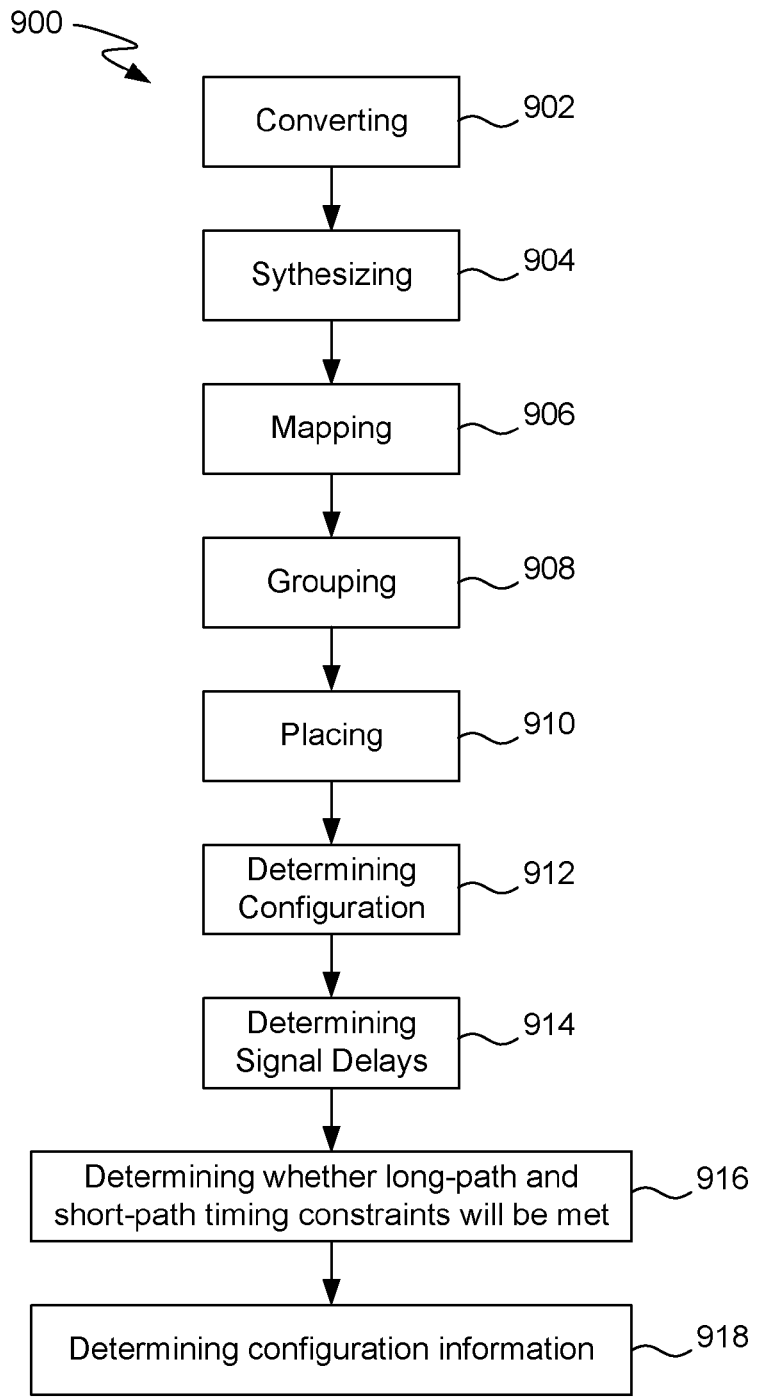
FIG. 9 shows an exemplary compilation technique executed by the computer system to generate the configuration information

With reference to FIG. 9, a method 900 for creating a design of an SOPC in accordance with one embodiment is shown. The created design may be subsequently used to generate configuration information for configuring the PLD 700. Processing unit 802 (FIG. 8) may access the program code, stored within memory device 804, for execution thereof in order to implement the method 900 in accordance with one embodiment.

Processing unit 802 may execute the program code for the method 900 to convert a user design in a given format, e.g., Hardware Description Language (HDL), into the configuration information. The PLD 700 is configured based on the configuration information to implement the user design.

At operation 902, a user design is converted into a register transfer layer (RTL) design of PLD 700. As an example, the RTL design may include a flow of signals between registers and logical operations that may be performed on the signals. At operation 904, the RTL design is synthesized into a set of logic gates. This set of logic gates may provide a synthesized design of PLD 700. At operation 906, the set of logic gates is mapped into a set of atoms. An atom is generally referred to irreducible constituents of a user design. The atoms may correspond to groups of logic gates and other components of the user design matching the capabilities of the LEs or other functional blocks of PLD 700. The user design may be converted into any number of different sets of atoms, depending upon the underlying hardware of PLD 700 used to implement the user design.

At operation 908, related atoms are grouped together to form clusters. At operation 910, the clusters of atoms are placed on multiple locations on PLD 700. At operation 912, configuration of the switching circuits of PLD 700 used to couple the atoms implementing the user design is determined. At operation 914, multiple signal delays, e.g., data delays, for the sets of atoms and their associated connections in the switching circuits are determined by using a timing model of the PLD 700. At operation 916, it is determined whether the implementation of the user design in PLD 700 will meet multiple long-path and short-path timing constraints. It is appreciated that in one embodiment, the timing constraints may be user specified via input device 808 (FIG. 8).

At operation 918, the configuration information is determined. The configuration information may include a configuration of each LE and the switching circuits used to couple the LEs. At operation 918, the configuration information is written in to a configuration file capable of being stored in the memory device 804 (FIG. 8) for access thereof. For example, the configuration file may be accessed by the processing unit 802 to configure the PLD 700.

Technical effects of the herein described systems and techniques for configuration of an SOPC may include eliminating a need for flash memory 108 (FIG. 1) at a time SOPC 304 (FIG. 3) is being configured. As a result, cost of designing and implementing flash memory 108 (FIG. 1) may be reduced and more board space on PCB 102 (FIG. 1) may be available or a smaller PCB 302 (FIG. 3) than PCB 102 (FIG. 1) can be used. Moreover, power for operating flash memory 108 (FIG. 1) may be saved. For example, in case a separate power supply may be used to operate flash memory 108 (FIG. 1) than a power supply used to operate SOPC 110 (FIG. 1), the systems and techniques may reduce the need for the separate power supply. The systems and techniques, described herein, may save the cost of the separate power supply.

Although the foregoing systems and techniques have been described in detail by way of illustration and example for purposes of clarity and understanding, it will be recognized that the above described systems and techniques may be embodied in numerous other variations and embodiments without departing from the spirit or essential characteristics of the systems and techniques. Some changes and modifications may be practiced, and it is understood that the systems and techniques are not to be limited by the foregoing details, but rather is to be defined by the scope of the appended claims.

What is claimed is:
1. A system comprising:
   a first voltage input;
   a second voltage input;
   a system on a programmable chip (SOPC) including a core and an interface;
   a plurality of configuration shift registers; and
   a multiplexer configured to multiplex between an output of the first voltage input or an output of at least one of the plurality of configuration shift registers based on a value of a user-mode bit, wherein:
   the interface is configured to communicate with a host via a link;
   during a first mode, the SOPC receives a first set of configuration data from the host via the interface and the SOPC configures, via the first voltage input and the second voltage input, the plurality of configuration shift registers to store the first set of configuration data;
   during a second mode, the SOPC receives a second set of configuration data from the host via the interface and the SOPC configures, via the first voltage input and the second voltage input, the plurality of configuration shift registers to store the second set of configuration data;

during at least one of the first mode and the second mode, use of non-volatile memory is restricted;

during the second mode, a first configuration of the core is established via the first or second voltage input; and during a third mode, the interface is configured by the second set of configuration data stored in the plurality of configuration shift registers in response to the first configuration of the core and the configuration of the plurality of the configuration shift registers.

2. The system of claim 1, wherein the first voltage input includes a direct current voltage input, and wherein the second voltage input includes a direct current voltage input.

3. The system of claim 1, wherein during the third mode, the interface is restricted from being configured by the first set of configuration data.

4. The system of claim 1, further comprising a link connecting the interface to a host, wherein the interface is configured to transfer data to the host at a rate of gigabits per second.

5. The system of claim 1, wherein the SOPC includes a field programmable gate array (FPGA) or an Application Specific Integrated Circuit (ASIC).

6. A method comprising:

receiving, during a first mode, at a system on a programmable chip (SOPC), a first set of configuration data from a host;

storing a plurality of configuration bits in a plurality of configuration shift registers of the SOPC, wherein said storing the plurality of configuration bits is performed by configuring, via a first voltage input and a second voltage input, the plurality of configuration shift registers of the SOPC based on the configuration data received from the host, wherein during the first mode use of non-volatile memory is restricted;

multiplexing between an output of the first voltage input or an output of a configuration shift register based on a value of a user-mode bit; and configuring, during a second mode, a core of the SOPC, wherein said configuring the core and the plurality of configuration shift registers is performed in response to the first set of configuration data.

7. The method of claim 6, further comprising restricting, during the first mode, the interface from being configured based on configuration data stored in a flash memory or a programmable read only memory.

8. The method of claim 6, further comprising configuring, during a third mode, the interface by the plurality of configuration bits stored in the plurality of configuration shift registers in response to the configuration of the core and the configuration of the plurality of the configuration shift registers.

9. The method of claim 8, further comprising restricting, during the third mode, the interface from being configured by the first and second voltage sources.

10. The method of claim 6, further comprising transferring data between the interface and a host at a rate of gigabits per second by coupling a link between the interface and the host.

11. The method of claim 6, wherein the SOPC includes a field programmable gate array (FPGA) or an Application Specific Integrated Circuit (ASIC).

12. A system comprising:

a host;

a system on a programmable chip (SOPC) including a core and an interface, wherein the interface is coupled to the host via a link;

a first voltage source;

a second voltage source, and a plurality of configuration shift registers, and a multiplexer configured to multiplex between an output of the first voltage input or an output of at least one of the plurality of configuration shift registers based on a value of a user-mode bit, wherein during a first mode, the interface is configured by applying voltage from the first voltage source or the second voltage source; and during a second mode, the SOPC receives a second set of configuration data from the host via the interface and the SOPC configures, via the first voltage input and the second voltage input, the plurality of configuration shift registers to store the second set of configuration data;

during at least one of the first mode and the second mode, use of non-volatile memory is restricted;

during the second mode, a first configuration of the core is established via the first or second voltage input; and during a third mode, the interface is configured by the second set of configuration data stored in the plurality of configuration shift registers in response to the first configuration of the core and the configuration of the plurality of the configuration shift registers.

13. The system of claim 12, wherein the SOPC includes a field programmable gate array (FPGA) or an Application Specific Integrated Circuit (ASIC), wherein the host includes a computer, wherein the first and second voltage sources are located on a printed circuit board, and wherein the interface is located on the printed circuit board.

14. The system of claim 12, wherein the SOPC is configured using configuration information from the host.

* * * * *